United States Patent
Ito et al.

(10) Patent No.: US 11,174,808 B2
(45) Date of Patent: Nov. 16, 2021

(54) AIR-FUEL RATIO CONTROL SYSTEM AND AIR-FUEL RATIO CONTROL METHOD

(71) Applicant: NGK SPARK PLUG CO., LTD., Nagoya (JP)

(72) Inventors: Tetsuya Ito, Nagoya (JP); Yuki Saito, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 17/039,778

(22) Filed: Sep. 30, 2020

(65) Prior Publication Data
US 2021/0115869 A1    Apr. 22, 2021

(30) Foreign Application Priority Data
Oct. 16, 2019    (JP) .............................. JP2019-189346

(51) Int. Cl.
F02D 41/14    (2006.01)
F01N 3/10    (2006.01)

(52) U.S. Cl.
CPC ......... F02D 41/1494 (2013.01); F01N 3/101 (2013.01); F02D 41/1454 (2013.01); *F02D 41/1456* (2013.01)

(58) Field of Classification Search
CPC ............. F02D 41/1454; F02D 41/1456; F02D 41/1494
USPC ...................................................... 123/697
See application file for complete search history.

(56) References Cited

U.S. PATENT DOCUMENTS

| | | | |
|---|---|---|---|
| 5,117,631 A * | 6/1992 | Moser ................. | F02D 41/1441 123/674 |
| 5,771,688 A | 6/1998 | Hasegawa et al. | |
| 6,526,954 B1 * | 3/2003 | Baranzahi ........... | F02D 41/1459 123/673 |
| 6,601,381 B2 * | 8/2003 | Mussmann ........... | F01N 11/007 60/274 |
| 6,848,439 B2 * | 2/2005 | Ohkuma ............. | F02D 41/1494 123/688 |
| 2014/0033812 A1 * | 2/2014 | Levijoki ............. | F02D 41/1495 73/114.73 |

FOREIGN PATENT DOCUMENTS

JP    9-126015 A    5/1997

* cited by examiner

*Primary Examiner* — Erick R Solis
(74) *Attorney, Agent, or Firm* — Sughrue Mion, PLLC

(57) ABSTRACT

An air-fuel ratio control system (1) including an air-fuel ratio control section (3) for controlling the air-fuel ratio λ of an air-fuel mixture, an exhaust gas purifier (4); an air-fuel ratio sensor (5) whose output changes sharply when λ in the exhaust gas changes between rich and lean sides about a stoichiometric air-fuel ratio; a heater (6); and a temperature control section (7). The air-fuel ratio control section (3) controls λ based on the output of the air-fuel ratio sensor (5) using, as a target air-fuel ratio, a predetermined air-fuel ratio such that $0.980 \leq \lambda < 1.000$ is satisfied, and when a change amount $\Delta\lambda$ λ is 0.008, an output difference $\Delta V$ is 150 mV or smaller. The temperature control section (7) controls the temperature of the air-fuel ratio sensor (5) to a predetermined target temperature of 650° C. or higher.

6 Claims, 7 Drawing Sheets ic # AIR-FUEL RATIO CONTROL SYSTEM AND AIR-FUEL RATIO CONTROL METHOD

BACKGROUND OF THE INVENTION

1. Field of the Invention

The present invention relates to an air-fuel ratio control system and to an air-fuel ratio control method.

2. Description of the Related Art

An air-fuel ratio control system has been known that performs feedback control using the output of an air-fuel ratio sensor provided in an exhaust passage (exhaust pipe) so as to perform air-fuel ratio control for an internal combustion engine. In such type of a system, the concentration of a specific gas (for example, oxygen) in exhaust gas is detected by the air-fuel ratio sensor, and air-fuel ratio feedback control is performed using the detected concentration.

As shown in, for example, Patent Document 1, a full-range air-fuel ratio sensor (A/F sensor) is used as an air-fuel ratio sensor. The A/F sensor provides a sensor output that varies linearly with the oxygen concentration in exhaust gas (the air-fuel ratio of an air-fuel mixture) in a wide range from the lean side to the rich side.
[Patent Document 1] Japanese Patent Application Laid-Open (kokai) No. H09-126015

3. Problems to be Solved by the Invention

For example, in some cases, a target air-fuel ratio is required to be set to a small range slightly offset to the rich side from the stoichiometric air-fuel ratio ($\lambda$=1) (the small range corresponds to a detection range whose width ($\Delta\lambda$) is, for example, 0.008) for the purpose of, for example, increasing the efficiency of purification of exhaust gas (removal of HC, CO, NOx) by a three-way catalyst. When the air-fuel ratio $\lambda$ is detected within such a small range using the A/F sensor, the sensor output of the A/F sensor hardly changes within that range. Namely, when the range in which the air-fuel ratio $\lambda$ is to be detected (hereinafter referred to as the "range of detection of the air-fuel ratio $\lambda$") is set to a specific small range, the output resolution of the A/F sensor becomes insufficient, and the A/F sensor becomes unable to detect the air-fuel ratio $\lambda$ in a linear manner.

Notably, in Patent Document 1, a binary sensor is also used as the air-fuel ratio sensor. The binary sensor outputs voltage which changes depending on whether the air-fuel ratio is on the rich side or the lean side with respect to the stoichiometric air-fuel ratio ($\lambda$=1). Patent Document 1 states that, although the output voltage of the binary sensor changes greatly when the air-fuel ratio changes through the stoichiometric air-fuel ratio ($\lambda$=1), the binary sensor can detect the air-fuel ratio $\lambda$ linearly within a small range ($\lambda$=0.996 to 1.004) near the stoichiometric air-fuel ratio ($\lambda$=1).

However, in Patent Document 1, the range in which the air-fuel ratio $\lambda$ can be detected linearly using the binary sensor is limited to the small range ($\lambda$=0.996 to 1.004) set between the rich side and the lean side to include the stoichiometric air-fuel ratio ($\lambda$=1). Therefore, for example, in the case where the range of detection of the air-fuel ratio $\lambda$ is set to a small range slightly shifted toward the rich side from the stoichiometric air-fuel ratio ($\lambda$=1) as descried above, the output resolution of the binary sensor is not sufficient, and there has been room for improvement. Notably, the binary sensor is inexpensive as compared to full-range air-fuel ratio sensors, and, therefore, use of the binary sensor as an air-fuel ratio sensor has been desired.

SUMMARY OF THE INVENTION

It is therefore an object of the present invention to provide an air-fuel ratio control system and an air-fuel ratio control method for controlling the air-fuel ratio to a predetermined target air-fuel ratio within a small range set on the rich side, using an air-fuel ratio sensor whose output voltage changes sharply when the air-fuel ratio changes between the rich side and the lean side through the stoichiometric air-fuel ratio.

The above object has been achieved by providing, in a first aspect of the invention, (1) an air-fuel ratio control system comprising: an air-fuel ratio control section for controlling an air-fuel ratio $\lambda$ of an air-fuel mixture supplied to an internal combustion engine by adjusting the air-fuel ratio $\lambda$ of the air-fuel mixture such that the air-fuel ratio $\lambda$ becomes equal to a target air-fuel ratio; an exhaust gas purifier which is provided on an exhaust side of the internal combustion engine and which purifies exhaust gas discharged from the internal combustion engine; an air-fuel ratio sensor which is provided on the exhaust side of the internal combustion engine and whose output changes sharply when the air-fuel ratio in the exhaust gas changes between a rich side and a lean side with respect to a stoichiometric air-fuel ratio while passing through the stoichiometric air-fuel ratio; a heater for heating the air-fuel ratio sensor; and a temperature control section which controls the temperature of the air-fuel ratio sensor by adjusting the temperature of the heater. The air-fuel ratio control section controls the air-fuel ratio $\lambda$ of the air-fuel mixture based on the output of the air-fuel ratio sensor using, as the target air-fuel ratio, a predetermined air-fuel ratio within a range in which an inequality of 0.980≤$\lambda$<1.000 is satisfied, and when a change amount $\Delta\lambda$ of the air-fuel ratio $\lambda$ is 0.008, an output difference $\Delta V$ of the air-fuel ratio sensor is 150 mV or smaller. The temperature control section controls the temperature of the air-fuel ratio sensor such that the temperature of the air-fuel ratio sensor becomes equal to a predetermined target temperature of 650° C. or higher.

In a preferred embodiment (2) of the air-fuel ratio control system (1) above, the output difference $\Delta V$ within the range in which the inequality of 0.980≤$\lambda$<1.000 is satisfied is 50 mV or greater when a change amount $\Delta\lambda$ of the air-fuel ratio $\lambda$ is 0.008.

In another preferred embodiment (3) of the air-fuel ratio control system (1) or (2) above, the temperature control section controls the temperature of the air-fuel ratio sensor such that the temperature of the air-fuel ratio sensor becomes 850° C. or lower.

In yet another preferred embodiment (4) of the air-fuel ratio control system of any of (1) to (3) above, the air-fuel ratio sensor is provided in the exhaust gas purifier or downstream of the exhaust gas purifier.

In a second aspect, the invention provides (5) an air-fuel ratio control method for controlling an air-fuel ratio $\lambda$ of air-fuel mixture supplied to an internal combustion engine by adjusting the air-fuel ratio $\lambda$ of the air-fuel mixture such that the air-fuel ratio $\lambda$ becomes equal to a target air-fuel ratio, wherein an exhaust gas purifier purifying exhaust gas discharged from the internal combustion engine is provided on an exhaust side of the internal combustion engine, and an air-fuel ratio sensor is provided on the exhaust side of the internal combustion engine, and an output of the air-fuel ratio sensor changing sharply when the air-fuel ratio in the exhaust gas changes between a rich side and a lean side with respect to a stoichiometric air-fuel ratio while passing through the stoichiometric air-fuel ratio. The method comprises: an air-fuel ratio control step of controlling the air-fuel ratio λ of the air-fuel mixture based on the output of the air-fuel ratio sensor using, as the target air-fuel ratio, a predetermined air-fuel ratio within a range in which an inequality of 0.980≤λ<1.000 is satisfied, and when a change amount Δλ of the air-fuel ratio λ is 0.008, an output difference ΔV of the air-fuel ratio sensor is 150 mV or smaller; and a temperature control step of adjusting the temperature of a heater for heating the air-fuel ratio sensor such that the temperature of the air-fuel ratio sensor becomes equal to a predetermined target temperature of 650° C. or higher.

In a preferred embodiment (6) of the air-fuel ratio control method (5) above, the output difference ΔV within the range in which the inequality of 0.980≤λ<1.000 is satisfied is 50 mV or greater.

Effect of the Invention

The present invention provides an air-fuel ratio control system and an air-fuel ratio control method for controlling the air-fuel ratio to a predetermined target air-fuel ratio within a small range set on the rich side, using an air-fuel ratio sensor whose output changes sharply when the air-fuel ratio changes between the rich side and the lean side through the stoichiometric air-fuel ratio.

DESCRIPTION OF REFERENCE NUMERALS

Figure 1:
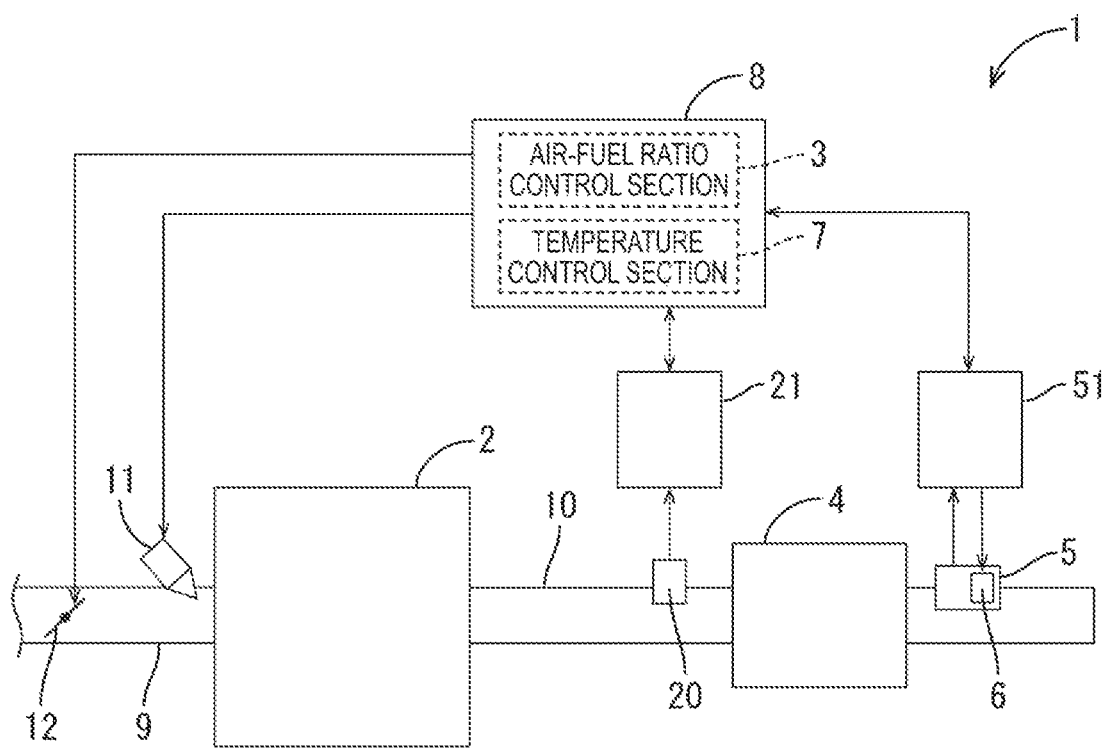
FIG. 1 is an explanatory diagram schematically showing the configuration of an internal combustion engine and its peripheral devices, the internal combustion engine being provided with an air-fuel ratio control system according to a first embodiment.

Reference numerals used to identify various features in the drawings include the following.

1, 1A: air-fuel ratio control system; 2: internal combustion engine; 3: air-fuel ratio control section; 4: three-way catalyst (exhaust gas purifier); 5: air-fuel ratio sensor; 6: heater; 7, 7A: temperature control section; 8, 8A: ECU; 9: intake pipe; 10: exhaust pipe; 11: injector; 12: throttle valve; 20: upstream side sensor; 21: second sensor controller; 51, 51A: first sensor controller

DETAILED DESCRIPTION OF THE PREFERRED EMBODIMENTS

The present invention will now be described in greater detail with reference to the drawings. However, the present invention should not be construed as being limited thereto.

First Embodiment

A first embodiment of the present invention will be described with reference to FIGS. 1 to 6. FIG. 1 is an explanatory diagram schematically showing the configuration of an internal combustion engine 2 and its peripheral devices. An air-fuel ratio control system 1 according to the first embodiment is provided for the internal combustion engine 2. The air-fuel ratio control system 1 is a system for controlling the air-fuel ratio λ of air-fuel mixture supplied to the internal combustion engine 2 mounted on a vehicle such that the air-fuel ratio λ becomes equal to a target air-fuel ratio λa. The air-fuel ratio control system 1 mainly includes an air-fuel ratio control section 3, a three-way catalyst (an example of an exhaust gas purifier) 4, an air-fuel ratio sensor 5, a heater 6, and a temperature control section 7. Notably, the air-fuel ratio control section 3 and the temperature control section 7 are formed by a CPU (Central Processing Unit) within an ECU (Electronic Control Unit) 8 for controlling operation of the internal combustion engine 2. The ECU 8 includes the CPU, a ROM, a RAM, etc. The CPU executes a program stored in the ROM. Detection signals from various types of sensors, including the air-fuel ratio sensor 5, are input to the ECU 8.

The internal combustion engine 2 is an in-line 4-cylinder 4-cycle engine of a spark ignition type. An intake pipe 9 through which air (intake air) taken from the outside flows is connected the upstream side of the internal combustion engine 2, and an exhaust pipe 10 through which exhaust gas (produced as a result of combustion of fuel) flows is connected to the downstream side of the internal combustion engine 2. A plurality of injectors (fuel injection valves) 11 are disposed in the intake pipe 9. The injectors 11 are connected to a fuel tank (not shown) and are provided for respective cylinders on the upstream side of the internal combustion engine 2 and inject fuel in accordance with control signals from the ECU 8. Notably, a throttle valve 12 for adjusting the amount of air taken into the internal combustion engine 2 is provided in the intake pipe 9 to be located on the upstream side of the injectors 11. The degree of opening of the throttle valve 12 is controlled in accordance with a control signal from the ECU 8.

The air taken from the outside moves within the intake pipe 9 while passing through an unillustrated air cleaner, the throttle valve 12, etc., and is mixed with the fuel (gasoline) injected from the injectors 11. The resultant air-fuel mixture having a predetermined air-fuel ratio is supplied to each cylinder of the internal combustion engine 2. Notably, an ignition plug is provided for each cylinder. In response to a control signal from the ECU 8, each ignition plug ignites, at a predetermined timing, the air-fuel mixture supplied to each cylinder. Exhaust gas produced as a result of combustion flows through the exhaust pipe 10 and is discharged to the outside.

The air-fuel ratio control section 3 controls the air-fuel ratio λ of the air-fuel mixture supplied to the internal combustion engine 2 by adjusting the air-fuel ratio λ of the air-fuel mixture such that the air-fuel ratio λ of the air-fuel mixture becomes equal to the target air-fuel ratio λa. The adjustment of the air-fuel ratio λ of the air-fuel mixture supplied to the internal combustion engine 2 is performed by the air-fuel ratio control section 3 through adjustment of, for example, the amount of fuel injected from the injectors 11 and/or the degree of opening of the throttle valve 12. The target air-fuel ratio λa is stored in the ROM of the ECU 8 beforehand. The target air-fuel ratio λa will be described in detail below.

Notably, in general, the air-fuel ratio refers to the mixture ratio (mass ratio) between air and gasoline. However, in the present specification, for the sake of convenience, the excess air ratio λ (=the actual air-fuel ratio/the stoichiometric air-fuel ratio) will be referred to as the air-fuel ratio, and the air-fuel ratio λ=1 shows the stoichiometric air-fuel ratio.

The three-way catalyst 4 is disposed midway in the exhaust pipe 10 connected to the exhaust side (downstream side) of the internal combustion engine 2 and purifies exhaust gas discharged from the internal combustion engine 2 and moving within the exhaust pipe 10 (removing, for example, hydrocarbon (HC), carbon monoxide (CO), and nitrogen oxides (NOx)).

The air-fuel ratio sensor 5 is composed of, for example, a sensor (binary sensor) which includes a zirconia sensor element whose output (electromotive force) changes in accordance with the difference in oxygen concentration between the atmosphere side and the exhaust side in such manner that the output sharply changes when the air-fuel ratio changes between the rich side and the lean side through the stoichiometric air-fuel ratio (λ=1).

As shown in FIG. 1, the air-fuel ratio sensor 5 is provided on the exhaust pipe 10 connected to the exhaust side of the internal combustion engine 2. Specifically, the air-fuel ratio sensor 5 is provided on a portion of the exhaust pipe 10 located on the downstream side of the three-way catalyst 4.

The air-fuel ratio sensor 5 is controlled by a first sensor controller 51. The first sensor controller 51 is formed by an ASIC (Application Specific integrated circuit), a microcomputer, or the like. The first sensor controller 51 is configured to send data to the ECU 8 and receive data from the ECU 8 through a communication line.

The air-fuel ratio sensor 5 includes a heater 6 for heating the sensor element, etc. (the air-fuel ratio sensor 5). The heater 6 is formed of a material whose main component is alumina and includes a heating resistor element formed of a material whose main component is platinum. Opposite ends of the heating resistor element are electrically connected to the ECU 8 (the temperature control section 7) via the first sensor controller 51. The heater 6 generates heat upon supply of electric power from the first sensor controller 51 in accordance with an instruction from the temperature control section 7 and is controlled such that the temperature of the air-fuel ratio sensor 5 (the sensor element) becomes equal to a predetermined target temperature T, described below. When the sensor element becomes active as a result of heating by the heater 6, the air-fuel ratio sensor 5 (sensor element) enters a state in which it can linearly detect the air-fuel ratio λ within a specific small range, which will be described later.

The temperature control section 7 controls the temperature of the air-fuel ratio sensor 5 such that the temperature of the air-fuel ratio sensor 5 becomes equal to the predetermined target temperature T of 650° C. or higher. The target temperature T is stored in the ROM of the ECU 8 beforehand. The target temperature T is set to fall with the range (temperature range) equal to or higher than 650° C. When the temperature of the air-fuel ratio sensor 5 is controlled to the target temperature T, the resolution of the output voltage of the air-fuel ratio sensor 5 improves. Notably, when the temperature of the air-fuel ratio sensor 5 exceeds 850° C., a problem associated with the durability of the air-fuel ratio sensor 5 may arise, although the resolution of the output voltage improves. Therefore, the upper limit of the target temperature T is preferably 850° C. or lower.

Figure 2:
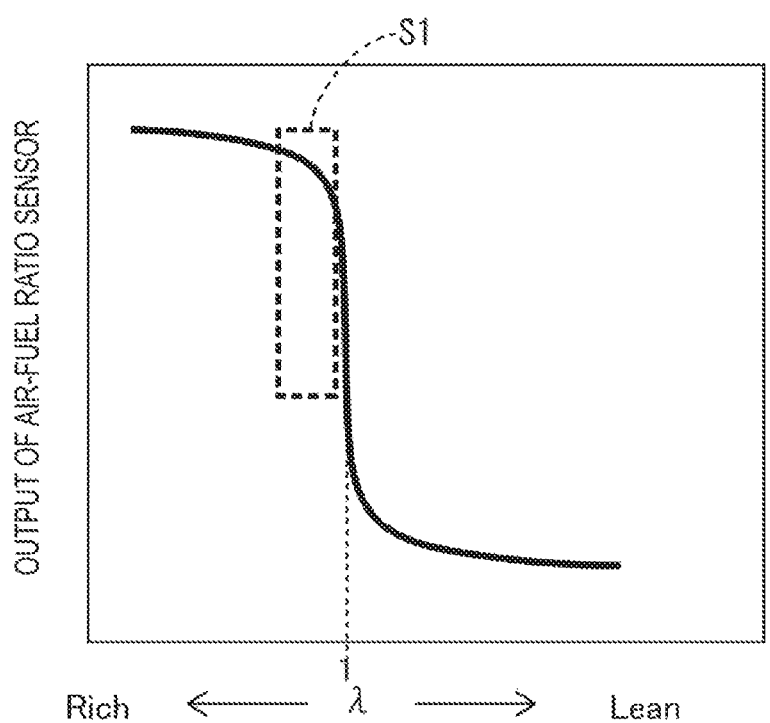
FIG. 2 is a graph schematically showing the output characteristics of an air-fuel ratio sensor.
Figure 3:
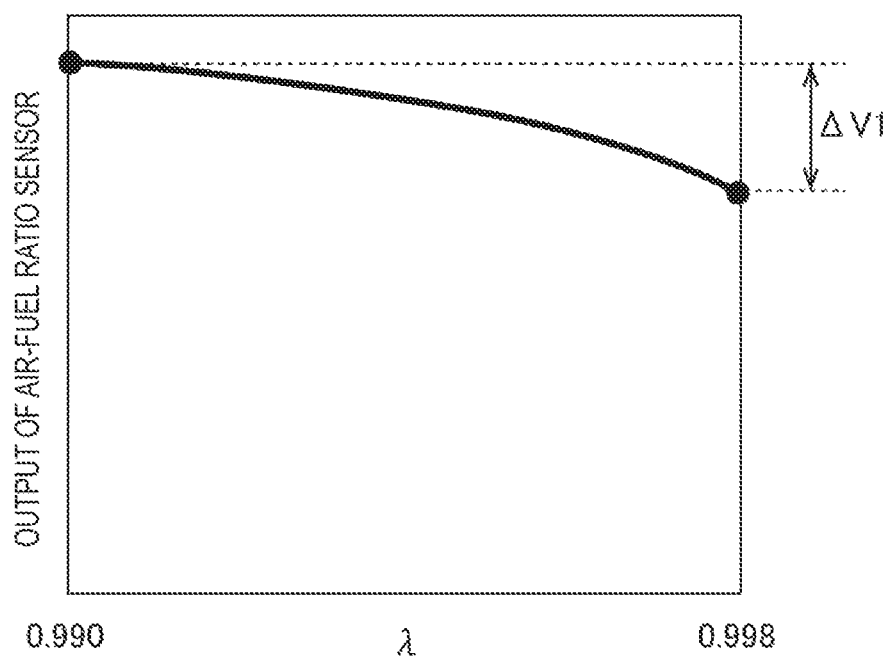
FIG. 3 is a graph showing, on an enlarged scale, a region indicated in FIG. 2.

The output characteristics of the air-fuel ratio sensor 5 will be described with reference to FIGS. 2 to 4. FIG. 2 is a graph schematically showing the output characteristics of the air-fuel ratio sensor 5. As shown in FIG. 2, the output (voltage) of the air-fuel ratio sensor 5 changes sharply when the air-fuel ratio changes between the rich side and the lean side through the stoichiometric air-fuel ratio (λ=1). Notably, FIG. 2 shows the output characteristics of the air-fuel ratio sensor 5 whose temperature is set to 600° C. (a temperature lower than the target temperature T). FIG. 3 is a graph showing, on an enlarged scale, a region S1 indicated in FIG. 2 (λ=0.990 to 0.998). FIG. 3 shows the output of the air-fuel ratio sensor 5 when the air-fuel ratio λ changes from 0.990 to 0.998. FIG. 3 shows the difference (ΔV1) between the output of the air-fuel ratio sensor 5 when the air-fuel ratio λ is 0.990 and the output of the air-fuel ratio sensor 5 when the air-fuel ratio λ is 0.998.

Figure 4:
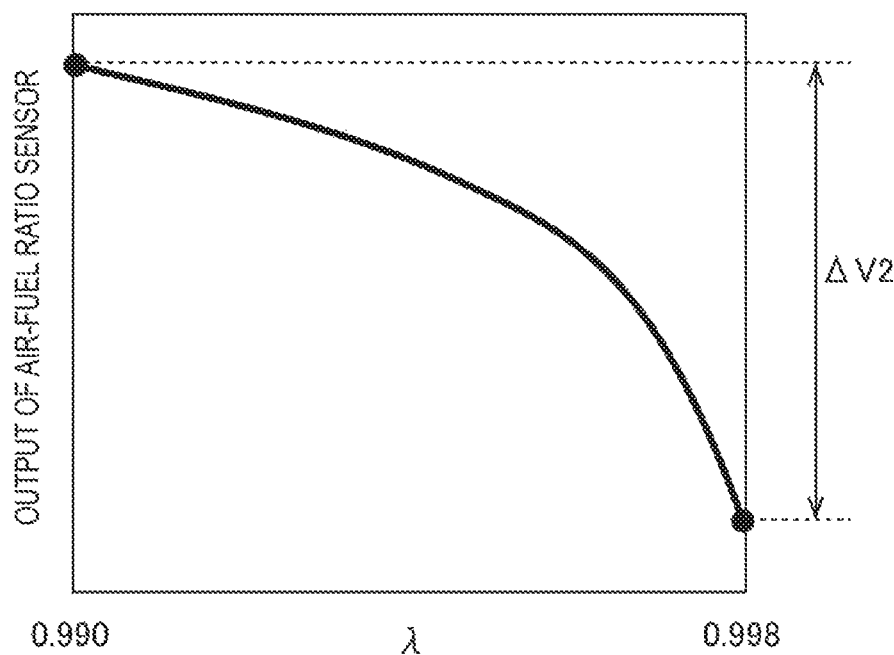
FIG. 4 is a graph schematically showing the output characteristics of the air-fuel ratio sensor set to a target temperature.

FIG. 4 is a graph schematically showing the output characteristics of the air-fuel ratio sensor 5 whose temperature is set to the target temperature T (λ=0.990 to 0.998). FIG. 4 shows the output characteristics of the air-fuel ratio sensor 5 in a range of the air-fuel ratio λ corresponding to the range shown FIG. 3. As shown in FIG. 4, when the temperature of the air-fuel ratio sensor 5 is equal to the above-described target temperature T, the difference (ΔV2) between the output of the air-fuel ratio sensor 5 when the air-fuel ratio λ is 0.990 and the output of the air-fuel ratio sensor 5 when the air-fuel ratio λ is 0.998 is larger than the difference (ΔV1) in the case where the temperature of the air-fuel ratio sensor 5 is 600° C. Namely, when the temperature of the air-fuel ratio sensor 5 is set to the target temperature T, the air-fuel ratio sensor 5 has improved output voltage resolution and can detect the air-fuel ratio λ linearly in a predetermined range of the air-fuel ratio λ (a slight rich range described below).

The target air-fuel ratio λa is set to fall within a small range slightly shifted from the stoichiometric air-fuel ratio (λ=1) toward the rich side (hereinafter referred to as the "slight rich range") for the purpose of, for example, increasing the efficiency of purification of exhaust gas (removal of HC, CO, and NOx) by the three-way catalyst 4. Specifically, the target air-fuel ratio λa is a predetermined air-fuel ratio within a range in which an inequality of 0.980≤λ<1.000 is satisfied, the change amount Δλ of the air-fuel ratio λ (the width of the range of detection of the air-fuel ratio λ) is 0.008, and the output difference ΔV of the air-fuel ratio sensor 5 is 150 mV or less. Information regarding the target air-fuel ratio λa is stored in the ROM of the ECU 8 beforehand.

Notably, the output difference ΔV in the above-described range is preferably 50 mV or greater. When the output difference ΔV in the above-described range is 50 mV or greater, the output resolution of the air-fuel ratio sensor 5 in the slightly rich range can be secured easily.

In the present embodiment, the upstream side gas sensor 20 is provided on a portion of the exhaust pipe 10 located on the upstream side of the three-way catalyst 4. The upstream side gas sensor 20 is an A/F sensor (limiting current-type oxygen sensor) and outputs an air-fuel ratio signal by linearly detecting the concentration of oxygen in exhaust gas discharged from the internal combustion engine 2, in a wide range extending from the rich side to the lean side. An LAF sensor (Lean Air Fuel sensor) may be utilized as the upstream side gas sensor 20. The upstream side gas sensor 20 includes a sensor element, a heater for maintaining the sensor element at its activation temperature, etc. When a predetermined voltage is applied to the upstream side gas sensor 20, the upstream side gas sensor 20 outputs a limiting current which changes linearly in accordance with the air-fuel ratio $\lambda$. The $\lambda$ detection range of the upstream side gas sensor 20 is about 0.8 to about 1.2. Notably, the upstream side gas sensor 20 is controlled by the second sensor controller 21. The second sensor controller 21 is formed by, for example, an ASIC or a microcomputer. The second sensor controller 21 is configured to send data to the ECU 8 and receive data from the ECU 8 through a communication line.

An air-fuel ratio control process (air-fuel ratio control step) and a temperature control process (temperature control step) executed by the ECU 8 will be described. The air-fuel ratio control process and the temperature control process are started when the internal combustion engine 2 (specifically, the air-fuel ratio control system 1) is started, and are continued until the internal combustion engine 2 (the air-fuel ratio control system 1) stops. Notably, the air-fuel ratio control process is executed after the temperature of the air-fuel ratio sensor 5 becomes equal to the predetermined target temperature T as a result of execution of the temperature control process.

The temperature control process is a process for adjusting the temperature of the heater 6 for heating the air-fuel ratio sensor 5 such that the temperature of the air-fuel ratio sensor 5 becomes equal to the predetermined target temperature T of 650° C. or higher. This process is executed by the temperature control section 7. The temperature control section 7 calculates the heat generation amount of the heater 6 necessary to maintain the temperature of the air-fuel ratio sensor 5 at the target temperature T set beforehand. The temperature control section 7 calculates the duty ratio of electric power supplied to the heater 6 based on the calculated heat generation amount of the heater 6, and causes the heater 6 to generate heat in accordance with a PWM (Plus Width Modulation) control signal having the calculated duty ratio.

The air-fuel ratio control process is a process for controlling the air-fuel ratio $\lambda$ of the air-fuel mixture supplied to the internal combustion engine 2 based on the output of the air-fuel ratio sensor 5 such that the air-fuel ratio $\lambda$ becomes equal to the target air-fuel ratio $\lambda a$, which is a predetermined air-fuel ratio within the above-described range in which an inequality of $0.980 \leq \lambda < 1.000$ is satisfied, the change amount $\Delta\lambda$ of the air-fuel ratio $\lambda$ is 0.008, and the output difference $\Delta V$ of the air-fuel ratio sensor 5 is 150 mV or less. This process is executed by the air-fuel ratio control section 3.

In the air-fuel ratio control process, specifically, the concentration of oxygen in exhaust gas is detected based on the sensor output of the air-fuel ratio sensor 5, the detected oxygen concentration is compared with a control reference value (a value corresponding to the oxygen concentration at the target air-fuel ratio), and a feedback coefficient is computed based on the result of the comparison. Subsequently, the amount of fuel injected from the injectors 11 and the degree of opening of the throttle valve 12 are computed in accordance with the feedback coefficient. Namely, in the air-fuel ratio control process, the air-fuel ratio of the air-fuel mixture is controlled by adjusting the amount of fuel injected from the injectors 11 and the degree of opening of the throttle valve 12 based on the sensor output of the air-fuel ratio sensor 5, whereby feedback control of the air-fuel ratio $\lambda$ based on the sensor output of the air-fuel ratio sensor 5 is performed.

The air-fuel ratio sensor 5 disposed on the downstream side of the three-way catalyst 4 is required to precisely control the air-fuel ratio $\lambda$ in exhaust gas so as to be in the vicinity of the stoichiometric air-fuel ratio. The output of the air-fuel ratio sensor 5 composed of a binary sensor changes sharply in the vicinity of the stoichiometric air-fuel ratio ($\lambda=1$), and the air-fuel ratio sensor 5 has a high output resolution in the above-described slight rich range. Therefore, the air-fuel ratio sensor 5 is preferably disposed on the downstream side of the three-way catalyst 4. Also, the cost of the air-fuel ratio control system 1 can be lowered by disposing the air-fuel ratio sensor 5, which is not an LAF sensor or the like but is a binary sensor, on the downstream side of the three-way catalyst 4.

Notably, in the present embodiment, the ECU 8 also performs feedback control of the air-fuel ratio $\lambda$ based on the sensor output of the upstream side gas sensor 20. The upstream side gas sensor 20 is required to detect the degree of deviation, from the stoichiometric air-fuel ratio, of the air-fuel ratio $\lambda$ in exhaust gas on the upstream side (the forward side) of the three-way catalyst 4. This configuration allows the air-fuel ratio $\lambda$ to quickly approach the stoichiometric air-fuel ratio, thereby allowing the air-fuel ratio $\lambda$ in exhaust gas on the downstream side (the rear side) of the three-way catalyst 4 to be precisely controlled to the vicinity of the stoichiometric air-fuel ratio. The ECU 8 (the upstream side air-fuel ratio control section) adjusts the amount of fuel injected from the injectors 11, etc., based on the sensor output of the upstream side gas sensor 20.

Specifically, the concentration of oxygen in exhaust gas is detected based on the sensor output of the upstream side gas sensor 20, the detected oxygen concentration is compared with a control reference value (a value corresponding to an oxygen concentration at the target air-fuel ratio), and a feedback coefficient is computed based on the comparison result. An amount of fuel injected from the injectors 11 and/or a degree of opening of the throttle valve 12 corresponding to the feedback coefficient are computed, and the air-fuel ratio of the air-fuel mixture is controlled based on the computed fuel injection amount and the computed opening degree.

As described above, the air-fuel ratio control system 1 of the present embodiment can control the air-fuel ratio $\lambda$ such that the air-fuel ratio $\lambda$ becomes equal to the predetermined target air-fuel ratio $\lambda a$ within a small range set on the rich side, through use of the air-fuel ratio sensor 5 whose output changes sharply when the air-fuel ratio changes between the rich side and the lean side while passing through the stoichiometric air-fuel ratio.

Figure 5:
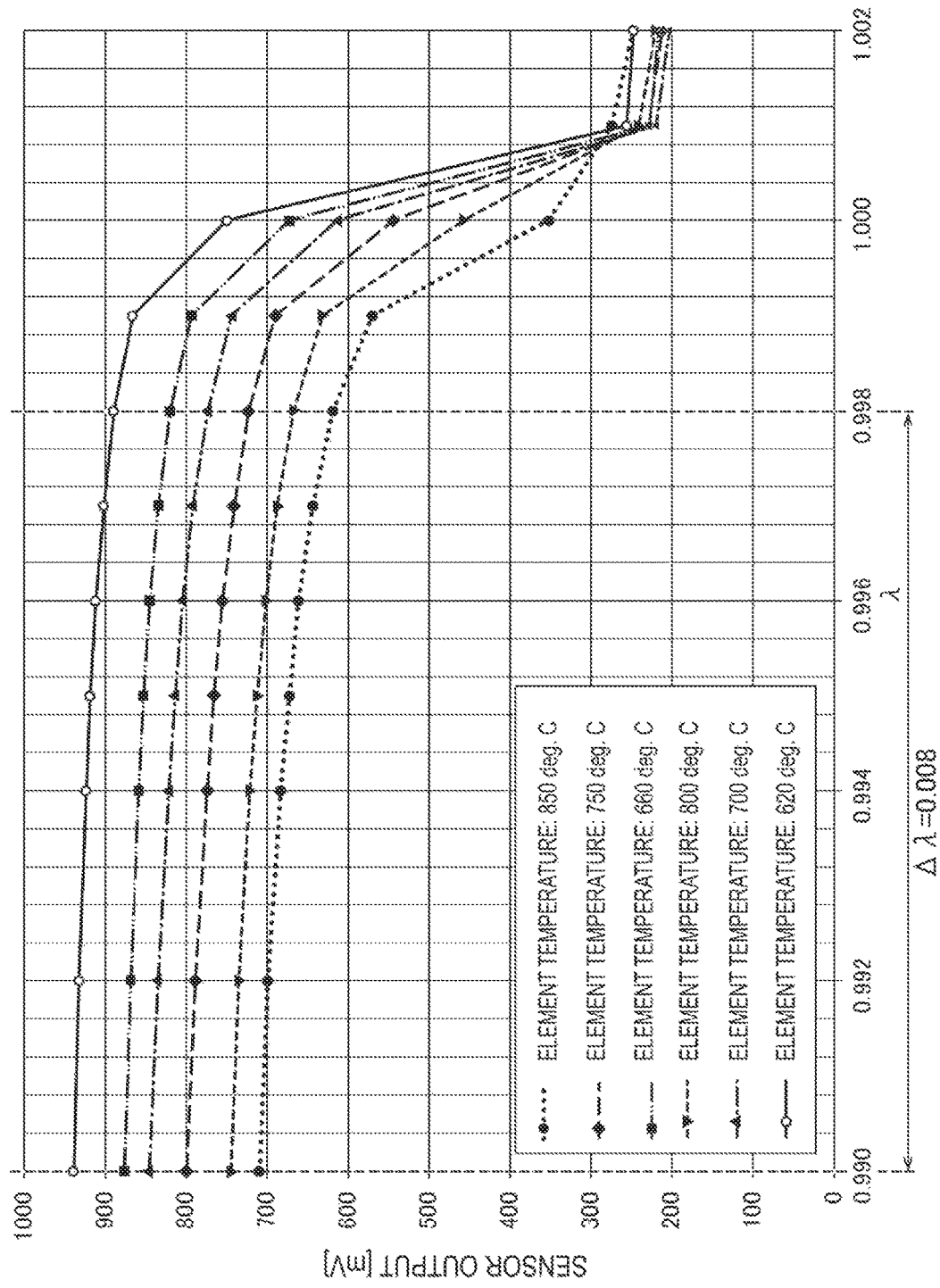
FIG. 5 is a graph showing the relation between air-fuel ratio and sensor output for cases where the air-fuel ratio sensor has different element temperatures.
Figure 6:
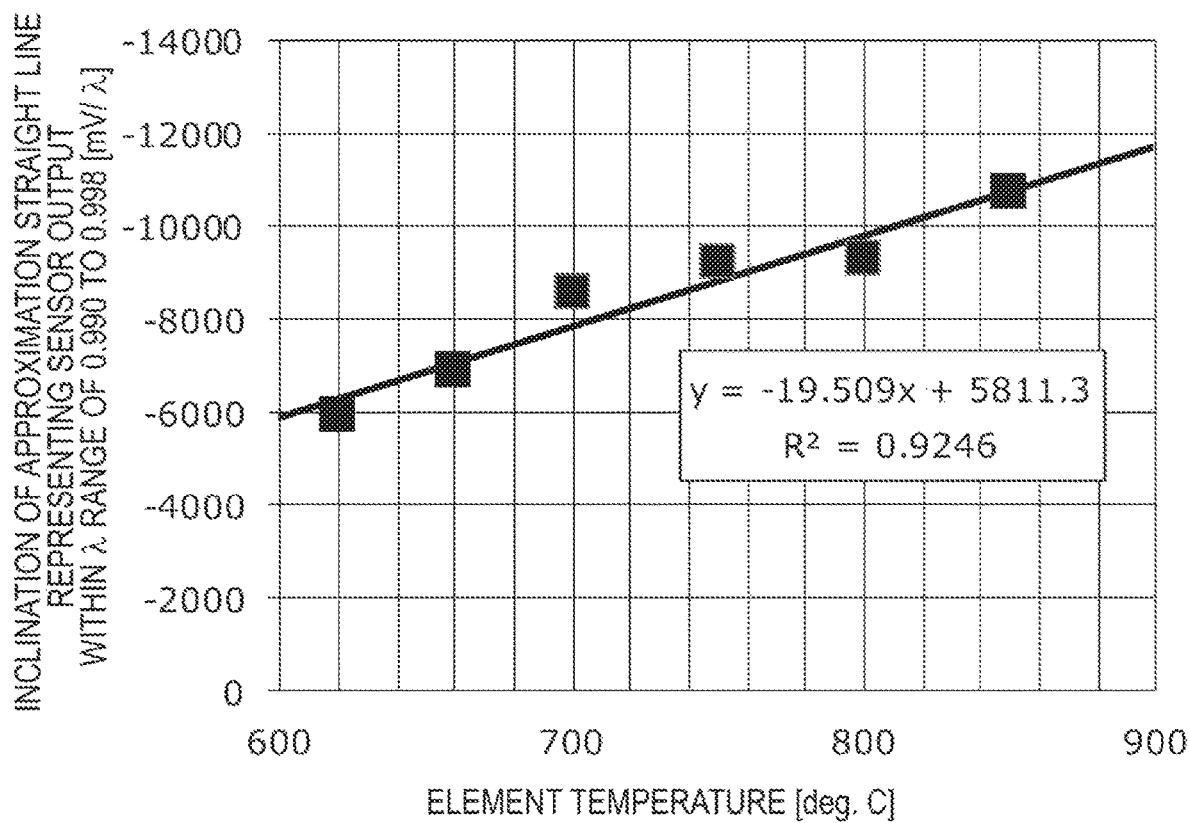
FIG. 6 is a graph showing the relation between the element temperature (° C.) of the air-fuel ratio sensor and the inclination of an approximation straight line representing the sensor output within an air-fuel ratio range of 0.990 to 0.998.

The (measured) relation between the temperature of the air-fuel ratio sensor 5 (the element temperature: the temperature of the sensor element) and the sensor output (electromotive force) will next be described. FIG. 5 is a graph showing the relation between the air-fuel ratio $\lambda$ and the sensor output (mV) for cases where the air-fuel ratio sensor 5 has different element temperatures. FIG. 5 shows the relation between the air-fuel ratio $\lambda$ and the sensor output for cases where the element temperature is 620° C., 660° C., 700° C., 750° C., 800° C., and 850° C. FIG. 6 is a graph showing the relation between the element temperature (° C.) of the air-fuel ratio sensor 5 and the inclination of a straight line approximately representing the sensor output within the range of the air-fuel ratio λ from 0.990 to 0.998.

As shown in FIG. 5, for example, in the above-described range of the air-fuel ratio λ (0.990 to 0.998), when the temperature of the air-fuel ratio sensor 5 (the element temperature) increases, the sensor output (mV) decreases. However, as shown in FIG. 6, a regression equation representing the relation between the element temperature and the inclination of the approximation straight line representing the sensor output in the above-described range of the air-fuel ratio λ (0.990 to 0.998) shows that the higher the temperature of the air-fuel ratio sensor 5 (the element temperature), the larger the inclination of the approximation straight line. When the temperature of the air-fuel ratio sensor 5 (the element temperature) increases, dissociation of water ($H_2O$) is accelerated, and the inclination of the approximation straight line in the above-described slight rich range increases. This is a phenomenon which occurs, as a result of an increase in the element temperature of the air-fuel ratio sensor 5. Namely, the equilibrium reaction of $H_2O \Leftrightarrow H_2 + \frac{1}{2} \cdot O_2$ occurs such that the reaction from the left side to the right side occurs more strongly than the reaction from the right side to the left side, and the amount of oxygen ($O_2$) increases. Even when the air-fuel ratio λ is the same, when the element temperature of the air-fuel ratio sensor 5 is high, the oxygen partial pressure in the vicinity of the element increases, and the sensor output deceases. Namely, when the element temperature of the air-fuel ratio sensor 5 is set to a high temperature (specifically, 650° C. or higher), instead of a steep line in the vicinity of the stoichiometric air-fuel ratio (λ=1) for the case where the element temperature is low (lower than 650° C.), a gently sloping line appears in the vicinity of the stoichiometric air-fuel ratio, so that the inclination of the approximation straight line in the slight rich range increases as described above.

Notably, the above-described range in which the target air-fuel ratio λa is set (the range in which the inequality of 0.980≤λ<1.000 is satisfied, the change amount Δλ of the air-fuel ratio λ is 0.008, and the output difference ΔV of the air-fuel ratio sensor 5 is 150 mV or less) specifies the slight rich range and is determined based on the graph shown in FIG. 5. The above-described range within which the target air-fuel ratio λa is set specifies a range within which the inclination of the approximation line is gentle, while eliminating a region where the inclination of the approximation line is steep.

Figure 7:
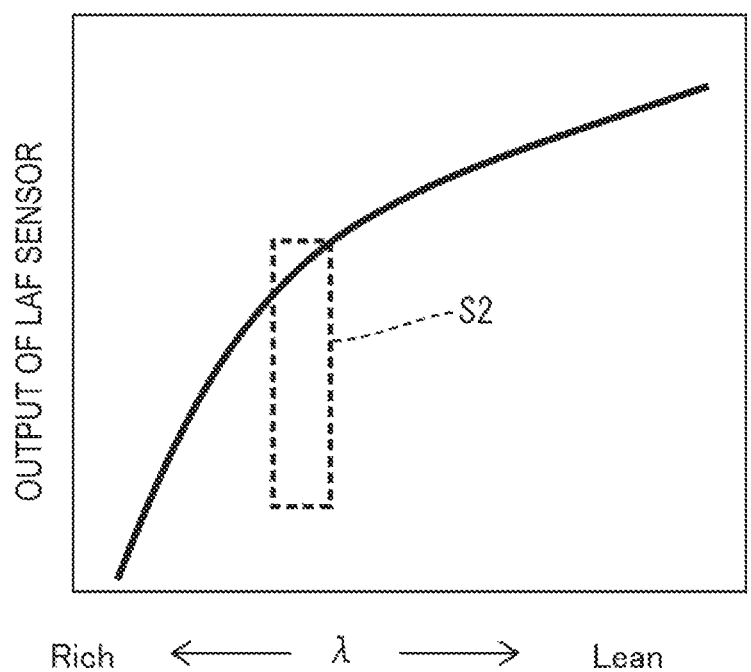
FIG. 7 is a graph schematically showing the output characteristics of an LAF sensor.
Figure 8:
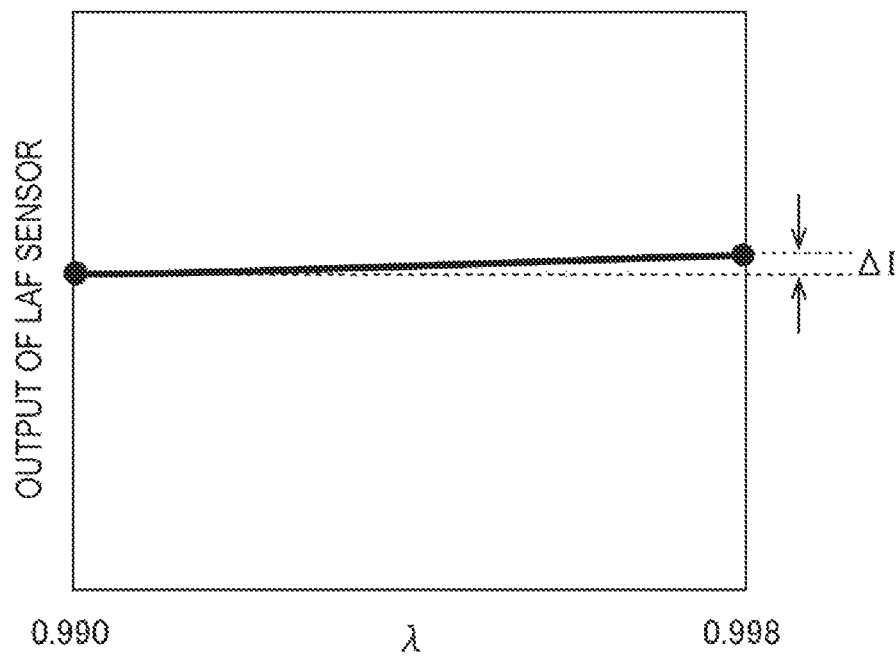
FIG. 8 is a graph showing, on an enlarged scale, a region indicated in FIG. 7.

Next, the output characteristics of a typical LAF sensor will be described as a reference with respect to FIGS. 7 and 8. FIG. 7 is a graph schematically showing the output characteristics of an LAF sensor, and FIG. 8 is a graph showing, on an enlarged scale, a region S2 indicated in FIG. 7. Like FIG. 3, FIG. 8 shows the sensor output (output characteristics) for the above-described range of the air-fuel ratio (λ=0.990 to 0.998). As well known, the LAF sensor can linearly detect the oxygen concentration (the air-fuel ratio λ) in exhaust gas in a wide range extending from the rich side to the lean side. However, in the case where the range of detection of the air-fuel ratio λ is limited to the above-described slight rich range, the LAF sensor has an insufficient output resolution. Namely, the sensor output when the air-fuel ratio λ=0.990 and the sensor output when the air-fuel ratio λ=0.998 are almost the same, and the difference (ΔI) therebetween is very small. In the case where the range of detection of the air-fuel ratio λ is limited to a specific slight rich range, the above-described binary sensor (the air-fuel ratio sensor 5) can detect the air-fuel ratio with greater linearity than the LAF sensor or the like.

Second Embodiment

Figure 9:
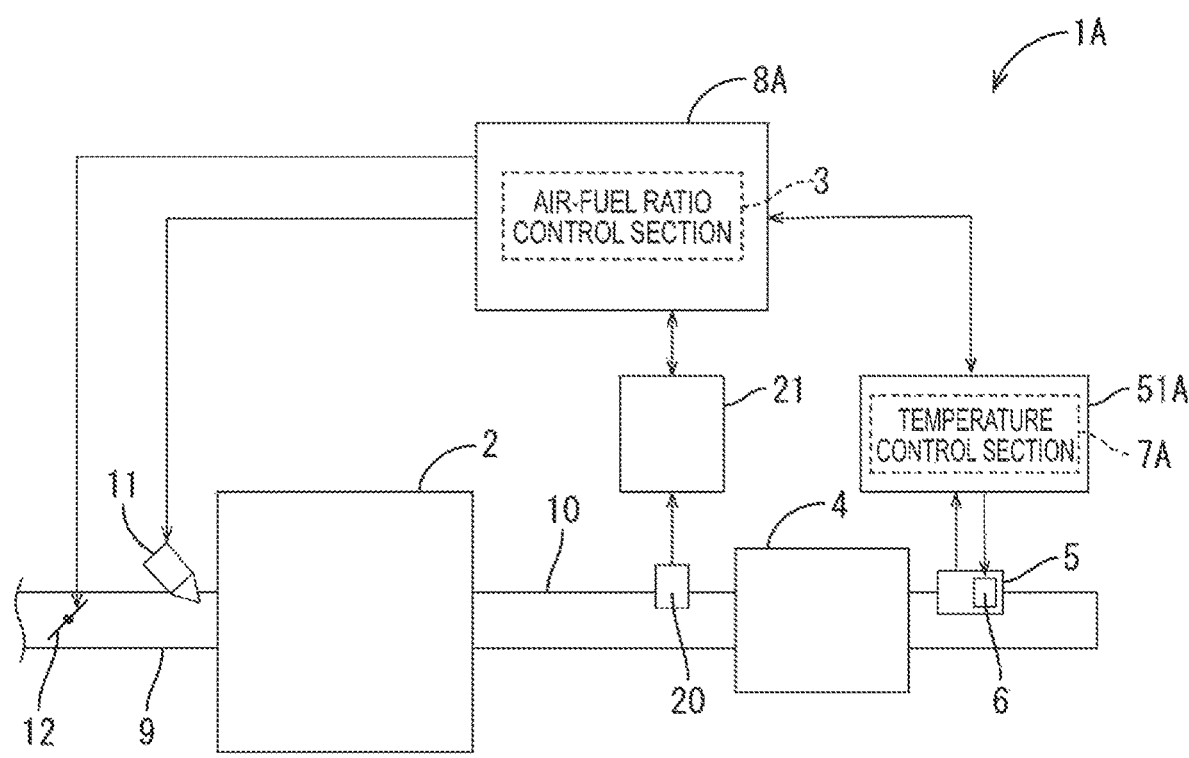
FIG. 9 is an explanatory diagram schematically showing the configuration of an internal combustion engine and its peripheral devices, the internal combustion engine being provided with an air-fuel ratio control system according to a second embodiment.

An air-fuel ratio control system 1A according to a second embodiment of the present invention will be described with reference to FIG. 9. In the air-fuel ratio control system 1A of the present embodiment, a temperature control section 7A is formed by a microcomputer of a first sensor controller 51A for controlling the air-fuel ratio sensor 5. Notably, as in the case of the first embodiment, the air-fuel ratio control section 3 is formed by the CPU of an ECU 8A. The structures of the remaining components of the air-fuel ratio control system 1A are the same as those of the first embodiment. Therefore, the remaining components are denoted by the same reference numerals as those in the first embodiment, and their detailed description will not be repeated.

In the present embodiment, the temperature control process (temperature control step) is executed by the temperature control section 7A. As in the case of the first embodiment, the temperature control process is a process for adjusting the temperature of the heater 6 for heating the air-fuel ratio sensor 5 such that the temperature of the air-fuel ratio sensor 5 becomes equal to the predetermined target temperature T of 650° C. or higher. The temperature control section 7A calculates the heat generation amount of the heater 6 necessary to maintain the temperature of the air-fuel ratio sensor 5 at the target temperature T set beforehand. The temperature control section 7A calculates the duty ratio of electric power supplied to the heater 6 based on the calculated heat generation amount of the heater 6, and causes the heater 6 to generate heat in accordance with a PWM (Plus Width Modulation) control signal having the calculated duty ratio.

Notably, the air-fuel ratio control process (the air-fuel ratio control step) of the present embodiment is the same as that of the first embodiment and is executed by the air-fuel ratio control section 3.

As described above, the temperature control section 7A may be formed by the microcomputer of the first sensor controller 51A instead of the CPU of the ECU 8A.

Other Embodiments

The present invention is not limited to the above embodiments described by reference to the drawings, and, for example, the following embodiments fall within the technical scope of the present invention.

(1) In the above-described first and second embodiments, the air-fuel ratio sensor 5 composed of a binary sensor is disposed on a portion of the exhaust pipe 10, the portion being located on the downstream side of the three-way catalyst 4. However, in another embodiment, the air-fuel ratio sensor 5 may be disposed at any location other than locations on the downstream side of the three-way catalyst 4 (for example, inside the three-way catalyst 4 or a location on the upstream side of the three-way catalyst 4) so long as the object of the present invention is achieved. Also, the air-fuel ratio sensor 5 may be disposed in the vicinity of any of other exhaust gas purifiers (NOx storage reduction catalyst, etc.) other than the three-way catalyst 4.

(2) In the above-described first and second embodiments, the air-fuel ratio sensor 5 is used as an oxygen sensor. However, in other embodiments, a gas sensor for detecting a gas other than oxygen may be used as an air-fuel ratio sensor, so long as the object of the present invention is achieved.

(3) In other embodiments, part of the configuration realized by software may be replaced with hardware.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application claims priority from Japanese Patent Application No. 2019-189346 filed Oct. 16, 2019, the disclosure of which is incorporated herein by reference in its entirety.

What is claimed is:

1. An air-fuel ratio control system comprising:
an air-fuel ratio control section for controlling an air-fuel ratio $\lambda$ of an air-fuel mixture supplied to an internal combustion engine by adjusting the air-fuel ratio $\lambda$ of the air-fuel mixture such that the air-fuel ratio $\lambda$ becomes equal to a target air-fuel ratio;
an exhaust gas purifier which is provided on an exhaust side of the internal combustion engine and which purifies exhaust gas discharged from the internal combustion engine;
an air-fuel ratio sensor which is provided on the exhaust side of the internal combustion engine and whose output changes sharply when the air-fuel ratio in the exhaust gas changes between a rich side and a lean side with respect to a stoichiometric air-fuel ratio while passing through the stoichiometric air-fuel ratio;
a heater for heating the air-fuel ratio sensor; and
a temperature control section which controls the temperature of the air-fuel ratio sensor by adjusting the temperature of the heater, wherein
the air-fuel ratio control section controls the air-fuel ratio $\lambda$ of the air-fuel mixture based on the output of the air-fuel ratio sensor using, as the target air-fuel ratio, a predetermined air-fuel ratio within a range in which an inequality of $0.980 \leq \lambda < 1.000$ is satisfied, and when a change amount $\Delta\lambda$ of the air-fuel ratio $\lambda$ is 0.008, an output difference $\Delta V$ of the air-fuel ratio sensor is 150 mV or smaller; and
the temperature control section controls the temperature of the air-fuel ratio sensor such that the temperature of the air-fuel ratio sensor becomes equal to a predetermined target temperature of 650° C. or higher.

2. The air-fuel ratio control system as claimed in claim 1, wherein the output difference $\Delta V$ within the range in which the inequality of $0.980 \leq \lambda < 1.000$ is satisfied of 50 mV or greater when a change amount $\Delta\lambda$ of the air-fuel ratio $\lambda$ is 0.008.

3. The air-fuel ratio control system as claimed in claim 1, wherein the temperature control section controls the temperature of the air-fuel ratio sensor such that the temperature of the air-fuel ratio sensor becomes 850° C. or lower.

4. The air-fuel ratio control system as claimed in claim 1, wherein the air-fuel ratio sensor is provided in the exhaust gas purifier or downstream of the exhaust gas purifier.

5. An air-fuel ratio control method for controlling an air-fuel ratio $\lambda$ of an air-fuel mixture supplied to an internal combustion engine by adjusting the air-fuel ratio $\lambda$ of the air-fuel mixture such that the air-fuel ratio $\lambda$ becomes equal to a target air-fuel ratio, wherein
an exhaust gas purifier purifying exhaust gas discharged from the internal combustion engine is provided on an exhaust side of the internal combustion engine;
an air-fuel ratio sensor is provided on the exhaust side of the internal combustion engine, an output of the air-fuel ratio sensor changing sharply when the air-fuel ratio in the exhaust gas changes between a rich side and a lean side with respect to a stoichiometric air-fuel ratio while passing through the stoichiometric air-fuel ratio; and
the method comprising:
an air-fuel ratio control step of controlling the air-fuel ratio $\lambda$ of the air-fuel mixture based on the output of the air-fuel ratio sensor using, as the target air-fuel ratio, a predetermined air-fuel ratio within a range in which an inequality of $0.980 \leq \lambda < 1.000$ is satisfied, and when a change amount $\Delta\lambda$ of the air-fuel ratio $\lambda$ is 0.008, an output difference $\Delta V$ of the air-fuel ratio sensor is 150 mV or smaller; and
a temperature control step of adjusting the temperature of a heater for heating the air-fuel ratio sensor such that the temperature of the air-fuel ratio sensor becomes equal to a predetermined target temperature of 650° C. or higher.

6. The air-fuel ratio control method as claimed in claim 5, wherein the output difference $\Delta V$ within the range in which the inequality of $0.980 \leq \lambda < 1.000$ is satisfied is 50 mV or greater when the change amount $\Delta\lambda$ of the air-fuel ratio is 0.008.

* * * * *